United States Patent [19]

Mori et al.

[11] 3,879,740

[45] Apr. 22, 1975

[54] LIGHT-MEASURING SYSTEMS

[75] Inventors: Chiharu Mori; Shoji Kamasako, both of Tokyo, Japan

[73] Assignee: Asahi Kogaku Kogyo Kabushiki Kaisha, Tokyo, Japan

[22] Filed: June 4, 1973

[21] Appl. No.: 366,485

[30] Foreign Application Priority Data

June 9, 1972 Japan .......................... 47-68351[U]

[52] U.S. Cl. ...................................... 354/24; 354/51

[51] Int. Cl. ............................. G01j 5/30; G03b 7/08

[58] Field of Search ........... 95/10 CT, 10 CE, 10 C; 354/24, 51, 60; 356/223

[56] References Cited

UNITED STATES PATENTS

| | | | |
|---|---|---|---|
| 3,678,826 | 7/1972 | Mori et al. | 95/10 CT |
| 3,679,905 | 7/1972 | Watanabe | 95/10 CT |
| 3,693,518 | 9/1972 | Yamada et al. | 95/10 CT |

*Primary Examiner*—Samuel S. Matthews
*Assistant Examiner*—Russell E. Adams, Jr.
*Attorney, Agent, or Firm*—Steinberg & Blake

[57] ABSTRACT

A light-measuring system in which a photodiode is electrically connected with a logarithmic compression element in a circuit which includes a voltage source and a source follower circuit connected between the voltage source on the one hand and the photodiode and the logarithmic compression element on the other hand for providing approximately zero voltage across the photodiode.

10 Claims, 4 Drawing Figures

LIGHT-MEASURING SYSTEMS

BACKGROUND OF THE INVENTION

The present invention relates to light-measuring systems.

Thus, the present invention relates to light-measuring systems which may take the form of an exposure meter built directly into a camera and connected, for example, to a shutter-controlling circuit or which may simply take the form of an exposure meter.

The invention relates in particular to that type of light measuring system which has a PN junction type of light-receiving element producing a photovoltaic effect such as that of solar battery.

In conventional light-measuring systems of the above type, the light-receiving element is usually a photodiode connected into a circuit with reverse bias voltage to obtain an output current proportional to the magnitude of the illumination at the light-receiving surface of the photodiode. This structure can be treated as a constant-current source whose output current value is proportional to the extent of illumination of the light-receiving surface of the photodiode. However, at low levels of illumination, for example, 0.01 lux, the influence of low-light or dark current increases to such an extent that it cannot be neglected, with the result that the output current no longer remains proportional to the extent of illumination of the light-receiving surface. The primary causes of this low-light or dark current are the reverse saturation of the PN junction diode, the resistance of the silicon thereof, or the leakage current resulting from surface leakage.

As a result of the above low-light or dark current influence at low levels of illumination, the range of effective use of such structures is limited to less than the light range required for normal photographic purposes. It is possible to eliminate the low-light or dark current influence effectively by utilizing the photodiode in a state of short-circuit load where the voltage across the photodiode is zero. As a practical matter, however, such an arrangement requires a highly complex coupling circuit between the photodiode and the electronic circuitry in which it is connected. Simple and effective circuitry for this purpose has not yet been provided.

SUMMARY OF THE INVENTION

It is accordingly a primary object of the present invention to provide a simple circuit for reducing the influence of the low-light or dark current during light-measuring operations to such an extent that this influence can be neglected for practical purposes.

Thus, it is an object of the present invention to make it possible to utilize in a light-measuring system a photosensitive element such as a photodiode having a photovoltaic effect in order to completely eliminate the drawbacks of a photoconductor such as a cadmium sulfide element, while at the same time increasing the range of light over which such a photovoltaic element can be effectively used.

In addition it is an object of the present invention to provide a simple effective circuit of the above type which lends itself to use according to the APEX system for determining exposure time.

In particular, it is an object of the present invention to provide a system of the above type which can readily be connected to a shutter-controlling circuit of a camera.

According to the invention, the light-measuring system includes photosensitive means for producing in response to impingement of light a photovoltaic effect in the form of a photocurrent which is proportional to the extent of illumination, this photocurrent being received by a logarithmic compression means which is electrically connected with the photosensitive means for providing an output voltage proportional to the magnitude of the illumination. A voltage source means is electrically connected with the photosensitive means and the logarithmic compression means for energizing them, and a source follower circuit means is electrically connected between the voltage source means on the one hand, and the photosensitive means and logarithmic compression means, on the other hand, for automatically providing approximately a zero voltage across the photosensitive means.

With the above light-measuring system of the invention it is possible to achieve over a range of illumination which is as great as $1{:}10^5$, as required by a light-receiving element of a camera, a current in the form of a photocurrent which is proportional to the extent of illumination of the light-receiving surface, forming the collector current of a transistor. As a result of the diode characteristics at the base-emitter part of the transistor, there is necessarily obtained a logarithmically compressed voltage output from the above photocurrent. Therefore, one of the big advantages achieved with the system of the invention resides in the fact that it can be very readily coupled to an electronic circuit for controlling a camera shutter.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
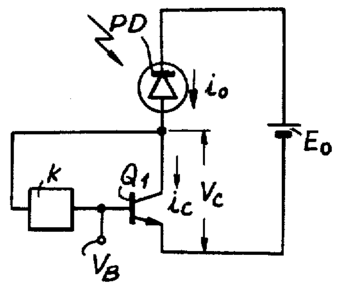
FIG. 1 is a schematic wiring diagram illustrating the principle of the invention.

Referring to FIG. 1, there is illustrated therein an example of a light-measuring system which has a photodiode connected into the illustrated circuit in a reverse-biased state. The transistor $Q_1$ of FIG. 1 is provided for logarithmically compressing photocurrent. The collector of the transistor $Q_1$ is electrically connected with the photodiode PD in such a way that it is reverse-biased with respect to the current source $E_0$. The base of the transistor $Q_1$ is self-biased with respect to the collector thereof through a buffer circuit means K such as a source follower circuit having a high input resistance characteristic such as that of an FET.

When the light input from the object to be photographed is received by the photodiode PD, this photodiode PD acts as a constant-current source, permitting the flow of a current whose value $i_0$ is determined by the extent of illumination of the light-receiving surface. Accordingly, it is clear that the collector current $i_c$ of transistor $Q_1$, whose self-bias is carried out through the buffer circuit means K, is automatically rendered equal to $i_0$. Moreover, due to the diode characteristic of the transistor $Q_1$, the base-emitter voltage $V_B$ of the transistor $Q_1$ is proportional to the logarithm of the collector current $i_c$. It is clear that for the purpose of the above logarithmic compression a non-linear element such as a diode may also be utilized. However, in the description which follows the transistor $Q_1$ is utilized for this purpose.

Assuming that the current $i_0$ (which is equal to $i_c$) is a current, which is to say a photocurrent ($i_p$) which is proportional to the extent of illumination of the light receiving surface, and that the logarithmic compression is made in the manner of a logarithm to base 2, then the above voltage $V_B$ can be made proportional to the APEX index in the APEX system of the addition formula of exposure parameters. Taking into consideration the proportional relationship between the illumination of the light receiving surface and the photocurrent $i_p$ as well as the proportional relationship between the illumination of the light receiving surface and the brightness B of the object which is to be photographed, it is possible to obtain the above voltage $V_B$ with a value which is proportional to $\log_2 B$.

In the light-measuring system of FIG. 1, in order to establish a relationship according to which $i_0$ is equal to $i_p$, the arrangement is to be made in such a way that the voltage of the source $E_0$ is equal to the collector voltage $V_C$ of the transistor $Q_1$. This collector voltage $V_C$ is automatically determined through the collector current $i_c$ (which is equal to $i_0$) of the transistor $Q_1$. In this event the voltage across the photodiode PD is zero, and it is in a state of so-called short-circuit load. This latter result can be achieved by utilizing a variable voltage source of the above function as the current source $E_0$.

Figure 2:
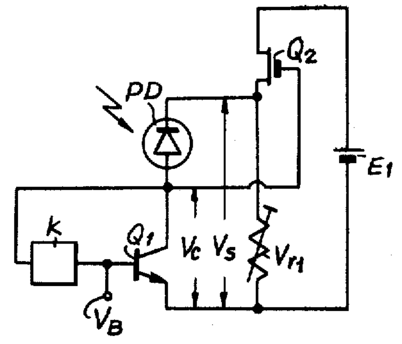
FIG. 2 is a schematic wiring diagram of one possible embodiment of the invention.

FIG. 2 illustrates a very simple system for achieving a current source having the above characteristics. Referring to FIG. 2 it will be seen that it is different from FIG. 1 by including between the voltage source means $E_1$, on the one hand, and the photosensitive means PD and logarithmic compression means $Q_1$, on the other hand, a source follower circuit means constituted by an MOS type FET $Q_2$ and a resistor $V_{rl}$ which is a semi or half-fixed resistor. The FET $Q_2$ has its gate electrode connected to a junction between the collector electrode of transistor $Q_1$ and the anode electrode of photodiode PD, while the source electrode of FET $Q_2$ is connected to the cathode electrode of photodiode PD. The battery $E_1$ is provided in the circuit as shown. It is to be understood that while the circuits are shown schematically as being closed there will of course be a switch in series with the battery in order to close and open the circuit. With this source follower circuit means of FIG. 2, by establishing the value of resistor $V_{rl}$ in such a way that a drain current is achieved which renders the gate source voltage $V_{GS}$ of FET $Q_2$ zero, then the output voltage $V_S$ at the source electrode is equal to $V_C$, and therefore the voltage across the photodiode PD is zero.

If FET $Q_2$ has a sufficiently large mutual conductance so that $G \approx 1$ where $G$ is the voltage gain of the above source follower circuit means, then the output voltage $V_S$ is approximately equal to the collector $V_C$ of transistor $Q_1$ which varies with the brightness of the object to be photographed.

It is ideal with the above system that $G = 1$. Practically, however, it is not absolutely essential that $G = 1$. For example, when the drain current is established in such a way that $V_{GS} = 0$ at the lowest illumination corresponding to the minimum extent of illumination of the entire possible range of illumination, when the operation of the circuit is fully satisfactory if $V_{GS}$ is at the greatest extent of illumination, where the maximum light of the possible range of illumination is provided, still within the threshold value which will forward-bias the photodiode PD. If this latter condition is satisfied then photodiode PD can act, independently of variation of brightness at the object to be photographed, with the voltage across itself being approximately equal to zero, so that the photodiode PD is in a state of short-circuit load, and thus the above influence of low light or dark current is eliminated and it is possible to achieve, in a very wide range of illumination, a voltage output $V_B$ which is proportional to the logarithm of the photocurrent $i_P$ which is in turn proportional to the extent of illumination of the light-receiving surface, this voltage output $V_B$ being the base-emitter voltage of the transistor $Q_1$.

In general the mutual conductance of an MOS type FET is smaller than that of a junction type FET, so that there is certain disadvantage in that in the practical case of the above source follower circuit means it is difficult to obtain an MOS type FET of large mutual conductance.

Figure 3:
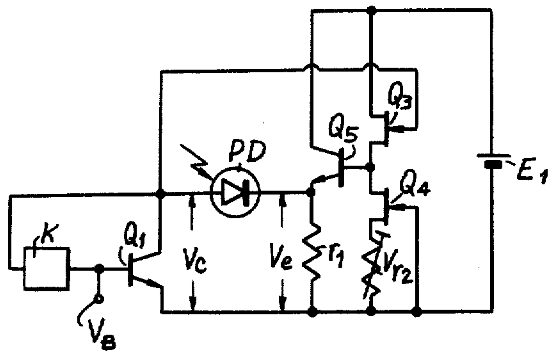
FIG. 3 is a schematic wiring diagram of another possible embodiment of the invention.

In order to eliminate this disadvantage, there is provided, in accordance with the embodiment illustrated in FIG. 3, a two-stage arrangement of a source follower circuit means using a junction type FET and a transistor emitter follower circuit. Referring to FIG. 3, N-channel junction type FET's $Q_3$ and $Q_4$ are provided. The gate-grounded FET $Q_4$ and resistor $V_{r2}$, also a semi or half-fixed variable resistor, connected to the source electrode of FET $Q_4$ constitute a constant-current circuit and constant-current drive the source current (equal to the drain current) of FET $Q_3$. A transistor $Q_5$, the input of which is formed by the voltage at the source electrode of FET $Q_3$, and a resistor $r_1$ constitute an emitter follower circuit. The gate electrode of FET $Q_3$ is connected to the junction in the series connection between the collector electrode of transistor $Q_1$ and the anode electrode of photodiode PD, while the emitter electrode of transistor $Q_5$ is connected to the cathode electrode of photodiode PD.

By establishing the value of resistor $V_{r2}$ so that the gate-source voltage $V_{GS}$ of the source follower circuit formed by FET $Q_3$ is equal to the base-emitter voltage $V_{BE}$ of transistor $Q_5$ of the emitter follower circuit connected to the source electrode of FET $Q_3$, the output voltage $V_e$ at the emitter electrode of transistor $Q_5$ is rendered equal to $V_C$ so that the voltage across photodiode PD is zero. It is therefore clear that with the embodiment of FIG. 3 it is possible to achieve the same effect as that of the embodiment of FIG. 2.

Thus with FIG. 3 it is possible to utilize a junction type FET, which is more readily obtained with high mutual conductance than the MOS type FET, in combination with the bipolar type transistor so that the necessarily present bias voltages of mutually reverse polarity cancel each other. It the mutual conductance of FET $Q_3$ is sufficiently large, the constant current circuit of FET $Q_4$ is not absolutely essential and in practice it is possible to utilize only the semi or half-fixed resistor $V_{r2}$.

Figure 4:
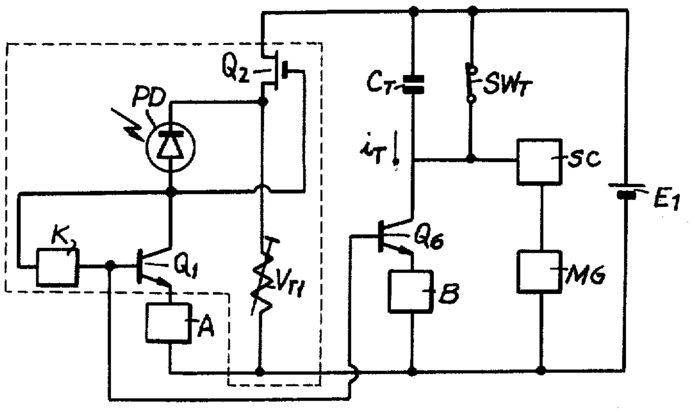
FIG. 4 illustrates the embodiment of FIG. 2 electrically connected with a shutter-controlling circuit.

FIG. 4 illustrates how the light-measuring system of the invention is coupled with an electronic shutter-controlling circuit. The light measuring system surrounded by the dotted lines in FIG. 4 is the system illustrated in the embodiment of FIG. 2.

The light input coming from the object to be photographed, after travelling through the camera objective, in the event that the camera is a through the lens type of camera, is transformed by photodiode PD into photocurrent $i_P$ which is proportional to the object brightness B. In order to make the collector current $i_c$ of transistor $Q_1$ equal to the photocurrent $i_p$, self-bias is provided from the collector to the base of the transistor $Q_1$ through the buffer circuit means K. Therefore, as mentioned above, at the base-emitter portion of transistor $Q_1$ there is provided a voltage which is proportional to $B_V$.

In series with the emitter electrode of transistor $Q_1$ there is a constant-voltage source A whose voltage value is established in such a way as to be proportional to the addition value $S_V—A_V$, where $S_V$ and $A_V$ are respectively the APEX indices of the film speed value S and the diaphragm aperture value A, and the constant of proportion is the same as that for the proportional relationship of the voltage $V_B$ to the value $B_V$. Therefore, the base voltage of transistor $Q_1$ is of a value which is proportional to the value $B_V + S_V - A_V$, so that this latter value is proportional to the APEX index $T_V$ of the exposure time T. A circuit is provided in which the transistor $Q_6$ has its collector connected to the timing capacitor $C_T$ and a normally closed switch $SW_T$, the latter components being connected in parallel to each other. The emitter of transistor $Q_6$ is connected with a constant-voltage source B. In this shutter-controlling circuit, the voltage which is proportional to $T_V$ is applied as an input to the base of transistor $Q_6$, and the voltage value of the constant-voltage source B is established in such a way that the collector current $i_T$ obtained on the basis of the diode characteristic of the base-emitter portion of transistor $Q_6$ is of a predetermined value established in the circuit design in order to obtain the exposure time T. In this case the collector current $i_T$ is of a value which is inversely proportional to the exposure time T. Thus, it is required that the base-emitter diode characteristics of transistors $Q_1$ and $Q_6$ are equal to each other. Through the thus obtained collector current $i_T$ the timing capacitor $C_T$ is constant-current charged up to a predetermined voltage value upon automatic opening of the switch $SW_T$ in synchronism with the opening of the shutter of the camera in a well known manner. A switching circuit means SC responds when capacitor $C_T$ is constant-current charged in the above way up to a predetermined voltage value in order to be triggered to bring about operation of the electromagnet MG in order to terminate the opening of the shutter, thus bringing about in this way an automatic control of the exposure time. In other words, it is well known that when the capacitor $C_T$ reaches a predetermined charge the trigger circuit SC will deenergize the electromagnet MG, for example, so as to permit the shutter to be closed.

When the circuitry of FIG. 4 is used in a single lens reflex camera, a so-called memory circuit is required in order to retain the light-measurement value from the instant immediately before the mirror of the camera is swung up beyond the optical axis up to the instant when the action controlling the shutter is completed. It is apparent that such an arrangement can readily be achieved by adding to the buffer circuit means K a well-known memory circuit such as one constituted by the combination of a capacitor and an FET.

As pointed out above, in the light-measurement system of the present invention, the use of a light-receiving element having a photovoltaic effect such as a photodiode completely eliminates the drawbacks resulting from the use of photoconductor element such as a cadmium sulfide element, these drawbacks being low response characteristics and susceptibility to light hysteresis effects and ambient temperature fluctuations. One of the important characteristics of the present invention resides in the fact that the elimination of undesirable influences from low-light or dark current, referred to above, which has always been a difficult problem when using a photovoltaic element as pointed out above, is reduced to a very great extent by an exceedingly simple circuit so that it is possible to achieve accurate light measurement values over a range of illumination which is as large as $1:10^5$, as is required by a light receiving device of a camera. Furthermore, since with the present invention the light measurement value is obtained as an output voltage which is proportional to $B_V$, coupling to a circuit for electronically controlling a shutter is possbile in a simple, easy, convenient manner.

What is claimed is:

1. In a light-measuring system, photosensitive means for producing, when receiving light, a photovoltaic effect in the form of a photocurrent the magnitude of which is indicative of the magnitude of the illumination received by said photosensitive means, logarithmic compression means electrically connected to one side of said photosensitive means for receiving said photocurrent and providing a logarithmically compressed output in the form of a voltage the magnitude of which is indicative of the magnitude of the illumination received by said photosensitive means, a voltage source means for energizing said photosensitive means and logarithmic compression means, and source follower circuit means connected across the photodiode and including at least one FET having its source and drain electrically connected across said voltage source means, its gate coupled to the interconnection between said one side of said photosensitive means and said logarithmic compression means and its source coupled to the other side of said photosensitive means, said FET having a circuit characteristic for providing approximately zero voltage across said photosensitive means.

2. The combination of claim 1 and wherein said photosensitive means is a photodiode in reverse-biased state.

3. The combination of claim 2 and wherein said source follower circuit means further includes a resistor electrically connected between the source of said FET and said voltage source means.

4. The combination of claim 3 and wherein said photodiode has an anode connected in series with said logarithmic compression means and a cathode connected to the source of the FET.

5. The combination of claim 4 and wherein said resistor has a value which provides at said FEt a drain current which makes the gate-source voltage of said FET zero.

6. The combination of claim 5 and wherein said FET is of the MOS type.

7. The combination of claim 3 and wherein said FET is of the junction type, and a bipolar transistor forming part of said source follower circuit means and being connected between a source electrode of said FET and a cathode of said photodiode.

8. The combination of claim 7 and wherein a second FET of the junction type is electrically connected between said resistor and said source electrode of said first-mentioned FET.

9. The combination of claim 3 and wherein said logarithmic compression means is a transistor whose collector is connected with the anode of said photodiode, and buffer circuit means electrically connected between the base of said transistor and the collector thereof for self-biasing said base with respect to said collector.

10. The combination of claim 9 and wherein the light-measuring system is electrically connected with a shutter-controlling system which includes a second transistor having a base electrically connected with the base of said first-mentioned transistor, a pair of constant-voltage source means electrically connected with the emitters of both of said transistors, respectively, a timing capacitor connected to the collector of said second transistor, switch means connected across said timing capacitor for rendering the latter operative in synchronism with opening of a shutter, electromagnet means for determining when the shutter closes, and swithching circuit means electrically connected between said electromagnet means and a junction between said timing capacitor and said collector of said second transistor for triggering and electromagnet means to terminate an exposure when said capacitor is charged to a given extent.

* * * * *